US006276758B1

(12) United States Patent
Hoffmann et al.

(10) Patent No.: US 6,276,758 B1
(45) Date of Patent: Aug. 21, 2001

(54) SURFACE MINER WITH TILTING SUPERSTRUCTURE FOR DEPTH CONTROL

(75) Inventors: Dieter Hoffmann, Leipzig; Volkmar Schrader, Schwarzheide; Thomas Stenzel, Hohenleipisch; Hans-Joachim Schombel, Meuro, all of (DE)

(73) Assignee: Man Takraf Fördertechnik GmbH (DE)

( * ) Notice: Subject to any disclaimer, the term of this patent is extended or adjusted under 35 U.S.C. 154(b) by 0 days.

(21) Appl. No.: 09/385,944

(22) Filed: Aug. 30, 1999

(30) Foreign Application Priority Data

Sep. 5, 1998 (DE) .............................. 198 40 600

(51) Int. Cl.$^7$ ................. E02F 5/08; E02F 5/26; E21C 47/00

(52) U.S. Cl. ............... 299/39.6; 299/36.1; 180/89.15

(58) Field of Search ............ 37/142.5; 180/89.13, 180/89.14, 89.15; 404/90; 299/36.1, 39.1, 39.2, 39.4, 39.6, 64

(56) References Cited

U.S. PATENT DOCUMENTS

| 4,041,623 | 8/1977 | Miller et al. . |
| 4,536,037 | 8/1985 | Rink . |
| 4,690,461 | 9/1987 | Rink . |
| 5,092,659 | 3/1992 | Grathoff . |
| 5,391,017 | * 2/1995 | Thomas et al. ............ 299/39.6 |
| 5,695,256 | * 12/1997 | Kishimoto ................. 299/39.2 |
| 5,823,707 | * 10/1998 | Lodovico .................. 299/39.6 |

FOREIGN PATENT DOCUMENTS

| 1 484 714 | 6/1969 | (DE) . |
| 26 30 457 | 3/1977 | (DE) . |
| 39 20 011 C3 | 1/1991 | (DE) . |
| 40 17 107 A1 | 3/1991 | (DE) . |
| 40 17 107 C2 | 3/1991 | (DE) . |

OTHER PUBLICATIONS

W. Vogt et al. Jun. 1995 Highly Selective Mining of Thin Strata in Surface Coal Mines Braunkohle Surface Mining.

Huron Manufacturing Company Easi–Miner® Model 1224 Continuous Surface Miner.

1987 2600 SM Technical Specification Wirtgen.

J. Saprykin ete al. Mar./Apr. 1997 Constructional and Technical Operational Preconditions and Practical Results when Developing a Surface Miner for Service in Russian Opencast Mines Braunkohle Surface Mining.

* cited by examiner

Primary Examiner—David Bagnell
Assistant Examiner—John Kreck
(74) Attorney, Agent, or Firm—McGlew and Tutle, P.C.

(57) ABSTRACT

A continuously operating surface miner designed basically with a milling roller for the accurate, selective mining of sedimentary beds. The parameters cutting height, cutting width and feed speed are decisive for the performance capacity of surface miners. How the miner begins a block to be mined, how it finishes it and changes over to a new block to be mined is significant as well. The particular technology that can be used depends essentially on the mobility of the miner and the possibility of the engagement of the milling roller with the material to be mined. A three-caterpillar chassis for the miner and for arranging the milling roller (15a) in front of the said chassis in the direction of mining is provided. The milling roller (15a) is mounted on a transverse frame (15b) and is fastened by same to the superstructure (8) of the miner. High mobility of the miner is achieved due to this arrangement of the milling roller and the use of the chassis. The miner always travels on a clean, freshly cut level, so that natural unevennesses or ditches dug to drain surface water do not interfere with the travel. Another advantage of this design is that the miner can move backward without problems, can strip corners with ease and can also open basin-shaped deposits with a circular feed movement.

2 Claims, 2 Drawing Sheets

SURFACE MINER WITH TILTING SUPERSTRUCTURE FOR DEPTH CONTROL

FIELD OF THE INVENTION

The present invention pertains to the design of a continuously operating, self-propelled surface miner with a roller-shaped mining member for the accurate, selective mining of mineral raw materials occurring in sedimentary beds. However, it may also be used to expose mineral deposits. A miner of such a design can be used economically under various geological conditions.

BACKGROUND OF THE INVENTION

Surface miners with a roller-shaped mining member for the selective mining of mineral raw materials occurring in sedimentary beds operate according to various mining methods. They depend essentially on the maneuverability of the miner and its type of mining and its mining performance. The design and the mode of operation of the mining member, the type of the chassis and the arrangement of the mining member in relation to the chassis, as well as the attainable mining performance are therefore very important for the design of such a miner. The mining performance of such a miner is determined by the cutting height, the cutting width and the feed speed. The feed speed is the velocity of travel of the miner. Since the wear of a miner increases in proportion to increasing velocity, it is important to appropriately coordinate the parameters that determine the mining performance with one another. Two possibilities of arranging the roller-shaped mining members in relation to the chassis have been known from the German journal *Braunkohle, Surface Mining*, 49 (1997), No. 2, pp. 123–128: The central arrangement and the frontal arrangement on the frame of the miner. The central arrangement of the roller-shaped mining members is defined here as their arrangement between the front and rear caterpillar elements (endless belt drive unit)and the front arrangement is defined as their displacement in the direction of travel and mining in front of the chassis. A first embodiment with a central arrangement has been known according to the U.S. prospectus "Easi-Miner®, Model 1224, Continuous Surface Miner" of the firm of Huron, U.S.A., and the patent specifications according to U.S. Pat. No. 4,536,037 and U.S. Pat. No. 4,690,461. The surface miner is equipped with a four-caterpillar chassis, wherein the caterpillar elements arranged in front of the mining member and the caterpillar elements arranged behind it are not steerable. The mining member designed as a milling roller is located between the front and rear caterpillar elements. The loosened material is thrown from the milling roller operating with an undershot onto a discharge belt, it is conveyed further there, and is transferred from this to a loading belt. The front pair of caterpillar elements of the chassis normally moves on the level to be removed, while the rear pair of caterpillar elements moves on the freshly removed level. If the miner operates in parallel next to an already removed block, an individual front caterpillar element of the caterpillar pair moves on the upper level directly next to the edge falling vertically. If greater cutting heights are reached, this may lead to the edge being broken off and to the lowering of the caterpillar element in the case of a loose substrate. In the case of unevennesses on the level to be mined off, which are formed, e.g., due to ditches dug to drain off surface water, travel on a straight plane, which is required for an accurate, selective mining of sedimentary beds, is not possible. The configuration of the miner, with the central arrangement of the milling roller, makes it also possible to perform mining while traveling in a curve due to the reliable and accurate steering. After a block has been mined off from the beginning to the end of the surface of the deposit, the miner is turned again and mining work is performed in the opposite direction. The milling roller cannot perform any mining operation between the rear and front caterpillar elements during this change in direction while traveling in tight curves. A similar surface miner, likewise with a central arrangement of the milling roller, has been known from the patent specification U.S. Pat. No. 5,092,659. Miners built according to this basic principle have also been known with a three-caterpillar chassis with one caterpillar element in front of the mining member and two caterpillar elements behind it (literature source: DE prospectus No. 25-21.01.1288, year 1987, "Wirtgen 2600 SM of the firm of Wirtgen). The advantages and drawbacks of the use of these miners are those described above.

The above-mentioned two surface miners are designed for the mining of relatively thin beds and therefore they must travel at a higher speed in order to reach an effective delivery output. They are therefore particularly suitable for loading the mined material on trucks, whereas they are only conditionally suitable for loading belts via a transfer conveyor. According to patent specifications U.S. Pat. No. 5,092,659, another surface miner with central arrangement of the roller-shaped mining member has been known. The most essential difference from the above-described, prior-art solutions is that mining operation can be performed in two opposite directions of travel due to the symmetrical arrangement of the mining member between the caterpillar groups and the specific design of the milling tools. As a result, turning is not necessary at the end of a block being mined. As a consequence of the steerability of all caterpillar elements of the chassis, the miner has good maneuverability and is also able to perform work while traveling in curves. Shorter runout ramps are sufficient at the end of each block being mined compared with the above-described miners. Since the particular caterpillar group that is in the direction of travel always travels on the upper level to be mined, the same drawbacks arise here as those described above concerning the breaking off of the edge in the direction of the lower-lying soil already mined and in the case of possible unevennesses on this upper level. One specific drawback of this miner is the complicated conveying of the cut material in the horizontal direction from the milling drum. The surface miner can mine the material in relatively thick beds compared with the above-mentioned two miners, it can travel correspondingly slowly, and it is suitable for conveying the mined material to a face conveyor via a transfer conveyor or a conveyor bridge.

All surface miners in which chassis parts are arranged in front of the mining member, as in the above-described three surface miners, also have, in principle, the drawback that they are unable to mine a residual material at the ends of a block being mined. This residual material must therefore be mined in a special operation.

The surface miner with the frontal arrangement of the roller-shaped mining member, which is known from the journal *Braunkohle, Surface Mining*, 49 (1997), No. 2, pp. 123–128, is equipped with a two-caterpillar chassis. As a result, turning is possible on the spot at the end of a block being mined. Travel in curves of any radius is also possible with this chassis arrangement, but high chain tensions always occur here, because the caterpillar element that is the inner caterpillar element in the curve always exerts a braking force and the caterpillar element that is the outer caterpillar element in the curve must overcome the normal propulsive force and additionally the braking force of the caterpillar element that is the inner caterpillar element in the curve. The arrangement therefore requires a high installed power and the chassis is subject to great wear. The miner is provided behind the mining member with an auxiliary device comprising a scraper blade and a skid in order to level material being conveyed that has been detached but not completely picked up on the roadway and to guarantee the secure position of the miner in the case of increased front-side load during the detachment and picking up of the material being conveyed. As a result, the necessary propulsive force increases. The miner has a relatively great mining height, because it can be in working connection with the material with its pick-up member over up to about two thirds of its diameter; it travels correspondingly slowly and can discharge the material being conveyed onto a face conveyor.

SUMMARY AND OBJECTS OF THE INVENTION

The primary object of the present invention is to provide a surface miner for a broad field of applications, for the accurate, selective mining of mineral raw materials occurring in sedimentary beds, for the mining of bowl-shaped deposits while traveling in curves, for the complete mining of the material at the end of the face, and for rapid turning at the time of the change in the direction of mining. Furthermore, the surface miner shall be able to mine relatively thick beds of one meter or more compared with the above-mentioned miners, to travel correspondingly slowly to reach the projected mining performance, and to load the cut material either on trucks or onto a face conveyor via an intermediate conveyor.

This object is accomplished by the surface miner being equipped with assembly units adapted to this field of application and by these assembly units being arranged in relation to one another such that an optimal configuration of the miner is achieved during use to accomplish this object.

According to the invention, a surface miner is provided with a chassis, a miner frame, a milling roller, which rotates around a horizontal axis of rotation at right angles to the direction of travel and extends over the entire width of the miner, a said discharge belt joining same in the direction of conveying, a said loading belt arranged downstream of the discharge belt, and drive units for the independent operation of the miner. The chassis is a three-caterpillar chassis with said two front oscillating caterpillar elements arranged in parallel to one another in the direction of mining and one rear, steerable oscillating caterpillar element. The three oscillating caterpillar elements of the caterpillar chassis are connected to one another in a statically determined three-point support by a frame-like substructure. The rear support on the steerable oscillating caterpillar element is brought about via a rotating fork with a rotating connection and an actuating element is provided between the oscillating caterpillar element and the substructure to achieve a steering movement. A superstructure is arranged on the substructure in a three-point support, wherein one support point above said steerable oscillating caterpillar element is formed by a support ball and the other two supports in the area of the two front oscillating caterpillar elements are formed by two linear adjusting cylinders, which can be actuated independently from one another. Two outer slideways are provided for centering and the compensating movement of the superstructure in relation to the substructure. A drive container with a driver stand placed on it is arranged on the superstructure. The milling roller module acting as the mining member is arranged under the superstructure in the front area in front of the three-caterpillar chassis. The discharge belt is led from the milling roller module between the front oscillating caterpillar elements through the superstructure to the rear area of the miner. The discharge belt is joined by the loading boom with the loading belt in a pivotable and height-adjustable manner for conveying.

The surface miner comprises the following principal assembly units:
  substructure with chassis
  superstructure
  milling roller module
  discharge belt
  loading boom with loading belt
  drive container
  driver stand.

The chassis is a conventional three-caterpillar chassis, comprising three oscillating caterpillar elements of identical design. The two oscillating caterpillar elements that are the front caterpillar elements in the direction of mining are arranged in parallel to one another on both sides of the miner within the horizontal projection of the miner. The third, steerable oscillating caterpillar is located at the other end of the miner in its middle. The substructure connects the three oscillating caterpillar elements of the chassis to one another. The support of the substructure on the chassis is statically determined, and the rear support on the steerable oscillating caterpillar is via a rotating fork with a ball bearing slewing rim. To steer the oscillating caterpillar, at least one actuating element is provided between the rotating fork and the substructure. High chain tension forces are not generated in the chains during travel in curves. They are approximately equal in the two front oscillating caterpillar elements in the inner and outer radii. As a result, the chassis correspondingly has low wear.

The superstructure is the support frame for the additional assembly units. In its rear area, it is designed for the suspension and the mounting of the loading boom. The connection for the milling roller module is located in its front area. The discharge belt is located between its two outer longitudinal beams. The drive container and the driver stand are arranged on the superstructure. The superstructure itself is supported on the substructure in the area of the rear oscillating caterpillar element via a support ball and in the area of the front oscillating caterpillar elements via two adjusting cylinders, and the centering and the compensating movement are ensured by means of two outer slideways. The adjusting cylinders may be operated simultaneously or individually and they can thus set and compensate longitudinal and transverse inclinations of the superstructure. Thus, the superstructure can be raised or lowered in the front on both sides to initiate a ramp, whereas the two adjusting cylinders are extended and withdrawn in opposite directions to initiate a transverse slope. Besides the milling roller with the milling tools, a transverse frame and a takeup chute belong to the milling roller module. The transverse frame is screwed to the superstructure under the superstructure. The milling roller is mounted and driven on both sides. A drive is arranged for this purpose on each side within the milling roller and is connected to the cross beam, on the one hand, and to the milling roller, on the other hand. The mounts of the output of the drives are also the mounts of the milling roller. The direction of cut of the milling roller is undershot, so that cutting upwards of the slices and dust formation are avoided. The cut material is pulled to the rear by the milling tools and is at the same time transported inwards in the direction of the center of the miner due to the single-start or multi-start, helical arrangement of the milling tools and guide and carrier plates and is thrown onto the discharge belt, which is narrower than the width of the milling roller. The takeup chute has the task of making it possible to convey the material being conveyed transversely through the helices of the milling roller, on the one hand, and to charge the material being conveyed onto the discharge belt, on the other hand. The type of the milling bits, their number and their helical arrangement in connection with the guide and carrier plates are determined such that a chunk size within a defined range can be obtained, reliable transverse conveying of the material being conveyed can be achieved, and lateral discharge of the material being conveyed can be minimized. The discharge belt begins directly behind the takeup chute of the milling roller module and is led between the front oscillating caterpillar elements through the superstructure up to the transfer in the rear area of the miner onto the loading belt.

The loading boom can be pivoted as well as raised and lowered. The mined material can be loaded by means of it either on trucks or on a face conveyor. Due to the large cut cross section, the working speed is low. It is therefore possible, in principle, to accompany the surface miner with a transfer conveyor, which should optimally have the same chassis as the surface miner, and to continuously discharge the material onto a belt system via the loading belt of the surface miner.

Due to the use of a three-caterpillar chassis and the arrangement of the milling roller in front of this chassis, the surface miner has particularly good maneuverability and nearly all strip mining areas can be opened. The fact that the surface miner travels on a freshly cut level during the mining operation is associated with the advantage that the chassis always moves on a flat roadway.

Further details and advantages of the subject of the present invention will appear from the following description and the corresponding drawings, which show a preferred exemplary embodiment of a surface miner with a three-caterpillar chassis and a mining member arranged in front of it in the direction of mining.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
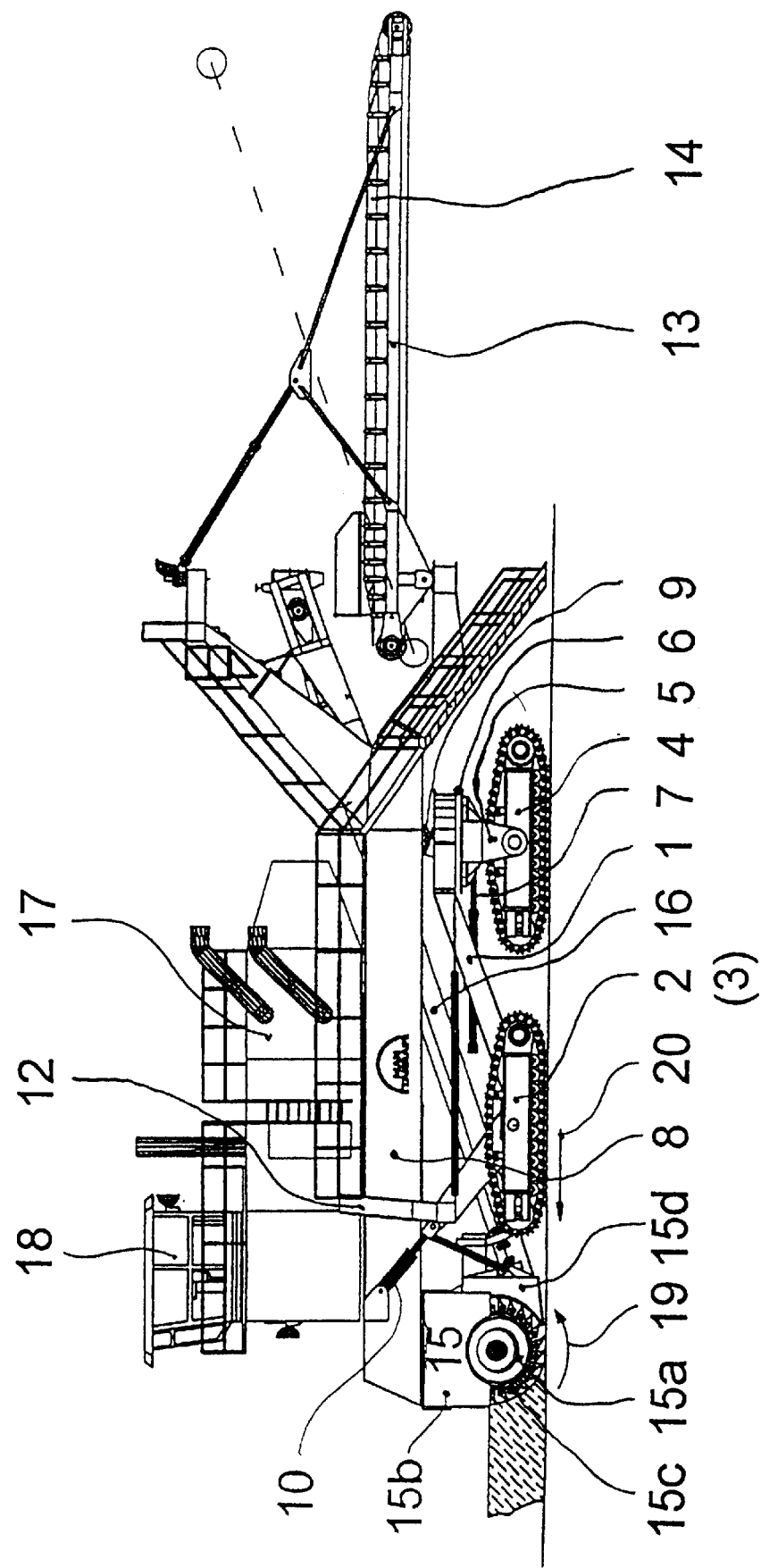
FIG. 1 is a side view of a surface miner.
Figure 2:
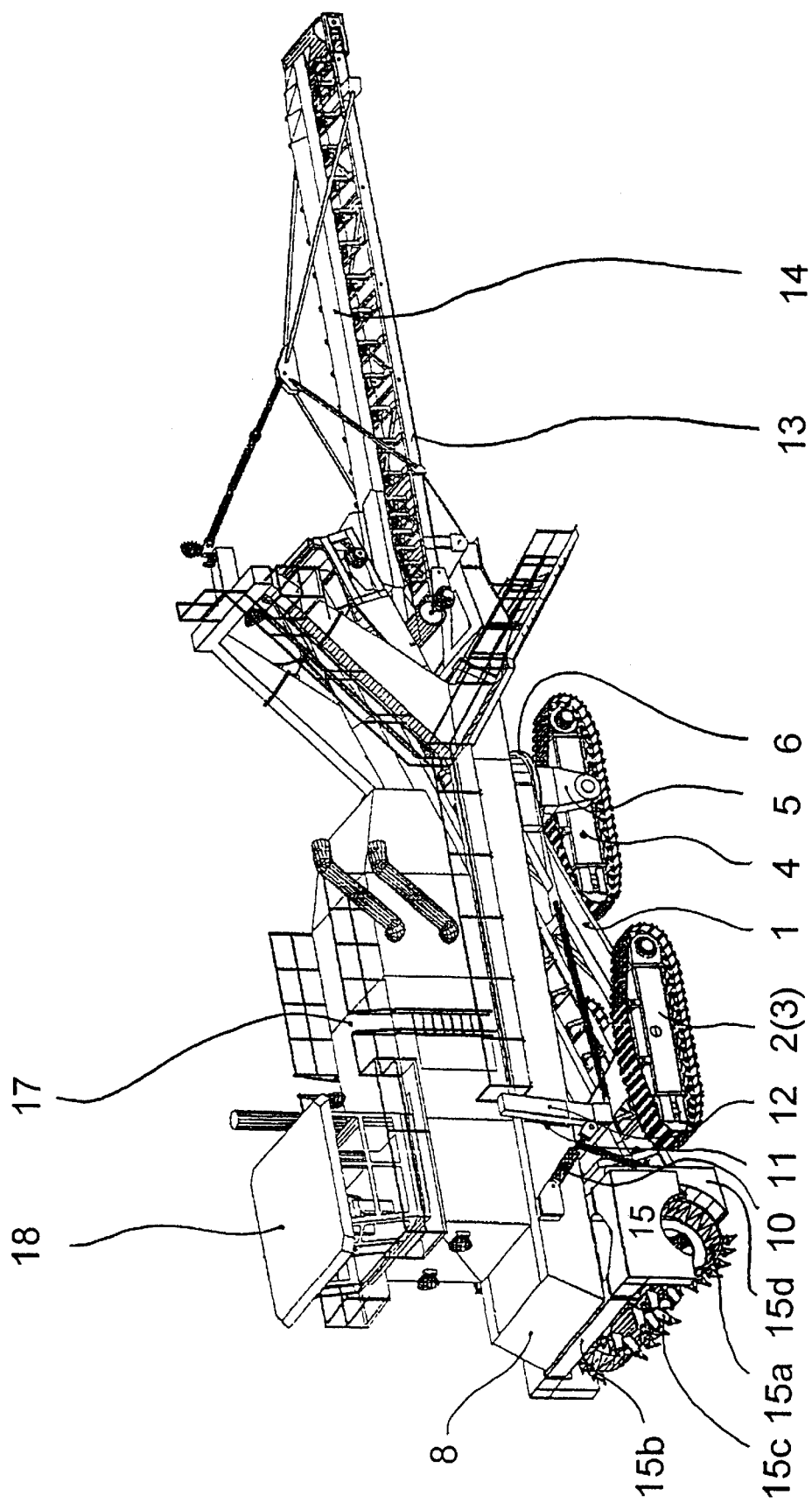
FIG. 2 is an overall perspective view of the surface miner according to FIG. 1.

Referring to the drawings in particular, a lower assembly unit of the surface miner comprises, according to FIGS. 1 and 2, the substructure 1 with the chassis. The chassis is a three-caterpillar chassis with three driven oscillating caterpillar elements 2, 3 and 4 of identical design, two of which, which are the front oscillating caterpillar elements 2 and 3 in the direction of mining, are arranged in parallel to one another, whereas the third oscillating caterpillar 4 is located centrally to the track of the front oscillating caterpillar elements 2 and 3 on the part of the miner that is the rear part in the direction of mining. The substructure 1 is designed as a frame and is supported in a statically determined manner on the three oscillating caterpillar elements 2, 3 and 4, the rear support on the third oscillating caterpillar 4 being achieved via a rotating fork 5 with a rotating connection 6, preferably designed as a ball bearing stewing rim. To achieve a steering movement, a linear actuating element 7 designed as a pair of hydraulic cylinders is provided between the rotating fork 5 and the substructure 1.

The superstructure 8 as another assembly unit is designed as a solid web structure with two longitudinal beams. It is supported in the middle on the substructure 1 in the area of the rear oscillating caterpillar 4 via a support ball 9 and on both sides in the area of the front oscillating caterpillar elements 2 and 3 via two adjusting cylinders 10, and centering and the compensating movement take place via slideways arranged on both sides, comprising arc-shaped sliding blocks 11 fastened to the superstructure 8 and sliding rails 12 arranged on the substructure 1 and aligned with the said sliding blocks 11.

In the rear area, the superstructure 8 is designed for suspending and mounting the loading boom 13 with the loading belt 14. The connection for the assembly unit mining member 15 is located in the front area. The discharge belt 16 is mounted between the two main walls of the superstructure 8. The drive container 17 with the driver stand placed on it is arranged on the superstructure 8.

The assembly unit mining member 15 comprises the milling roller 15a with the milling tools 15c, the stable transverse frame 15b and the takeup chute 15d.

The function of the surface miner is described as follows:

The milling rollers 15a, the discharge belt 16, the loading belt 14, and the three-caterpillar chassis are started up via the drives. The direction of rotation 19 of the milling roller 15a and the direction of travel 20 of the miner during the mining operation are indicated by arrows. The milling roller 15a operates with an undershot and loosens the material from the ground with its milling tools 15c. The loosened material to be conveyed is transferred via a charging chute to the discharge belt 16 and from this onto the loading belt 14. The material being conveyed is transferred from the loading belt 14 either directly to trucks or to a conveyor system via a transfer conveyor.

The cutting height of the milling roller 15a is set and changed by means of the two adjusting cylinders 10.

The entire process is controlled from the driver stand 18.

Due to the milling roller 15a being arranged in front of the three-caterpillar chassis, the chassis always travels on a clean, freshly cut level, so that natural unevennesses or ditches dug to drain the surface water do not interfere with the feed movement. Another advantage of this design is that the miner can move backward without problems, can strip corners with ease and can also open basin-shaped deposits with a circular feed movement. Due to the possibility of actuating the adjusting cylinders 10 together and separately, the milling roller 15a can be adjusted in its longitudinal axis in relation to the substrate and longitudinal and transverse inclinations of the superstructure can be compensated or brought about deliberately. The milling roller can thus be moved into the area to be mined at different lateral inclinations of the initial level and of the desired cutting plane until the intended cutting height is reached. To initiate a ramp, the superstructure 8 is raised or lowered in the front on both sides, whereas the two adjusting cylinders 10 are extended and withdrawn in opposite directions to initiate a transverse slope.

Due to the three-caterpillar chassis, the surface miner can be readily steered. High chain tension forces are not generated on the oscillating caterpillar elements 2, 3 and 4 during travel in curves. Wear is therefore low.

Due to the milling roller module 15 being arranged in front of the chassis in the front under the superstructure 8 of the miner and the fastening being designed as a detachable fastening, it is possible to remove the milling roller module 15 as a separate unit or to replace it with another one.

While a specific embodiment of the invention has been shown and described in detail to illustrate the application of the principles of the invention, it will be understood that the invention may be embodied otherwise without departing from such principles.

What is claimed is:

1. A surface miner, comprising:

a three-caterpillar chassis with two front oscillating caterpillar elements arranged in parallel to one another in the direction of mining and one rear steerable oscillating caterpillar element;

a frame shaped substructure, said three oscillating caterpillar elements of said caterpillar chassis are connected to one another in a statically determined three-point support by said frame-like substructure, a rear part of said support on said rear steerable oscillating caterpillar element includes a rotating fork with a rotating connection and an actuating element provided between said oscillating caterpillar and said substructure to achieve a steering movement;

a superstructure arranged on said substructure in a three-point support, wherein one support point above the said rear steerable oscillating caterpillar element is formed by a support ball and the other two supports in the area of said two front oscillating caterpillar elements are formed by two linear adjusting cylinders, which can be actuated independently from one another, and two outer slideways are provided for centering and a compensating movement of said superstructure in relation to said substructure;

a milling roller module with a milling roller acting as the mining member is arranged under the said superstructure in a front area in front of said three-caterpillar chassis, said milling roller rotating around a horizontal axis of rotation at substantially right angles to the direction of travel and extends over substantially the entire width of the miner;

a discharge belt adjacent to said milling roller in the direction of conveying said discharge belt being led from said milling roller module between said front oscillating caterpillar elements through the superstructure to a rear area of the miner;

a loading belt arranged downstream of said discharge belt;

a loading boom, said discharge belt being joined with said loading belt in a pivotable and height-adjustable manner for conveying;

drive units for the independent operation of the miner; and a drive container with a driver stand placed on said drive container arranged on said superstructure.

2. A surface miner, comprising:

three oscillating belt drive units with two front belt drive units arranged in parallel to one another in the direction of mining and one rear steerable oscillating belt drive unit;

a frame shaped substructure, said three oscillating belt drive units are connected to one another in a statically determined three-point support by said frame shaped substructure, a rear part of said support on said rear steerable belt drive unit includes a rotating fork with a rotating connection;

an actuating element provided between said steerable belt drive unit and said substructure to achieve a steering movement;

a superstructure arranged on said substructure in a three-point support, wherein one support point above the said rear steerable oscillating belt drive unit is formed by a support ball and the other two supports in the area of two front oscillating belt drive units are formed by two linear adjusting cylinders, which can be actuated independently from one another, and two outer slideways are provided for centering and the compensating movement of said superstructure in relation to said substructure;

a milling roller module with a milling roller acting as the mining member is arranged under the said superstructure in a front area in front of said three belt drive unit, said milling roller rotating around a horizontal axis of rotation at substantially right angles to the direction of travel and extends over substantially the entire width of the miner;

a discharge belt adjacent to said milling roller in the direction of conveying said discharge belt being led from said milling roller module between said front belt drive units through the superstructure to a rear area of the miner;

a loading belt arranged downstream of said discharge belt; and a loading boom, said discharge belt being joined with said loading belt in a pivotable and height-adjustable manner for conveying.

* * * * *